United States Patent Office 3,728,295
Patented Apr. 17, 1973

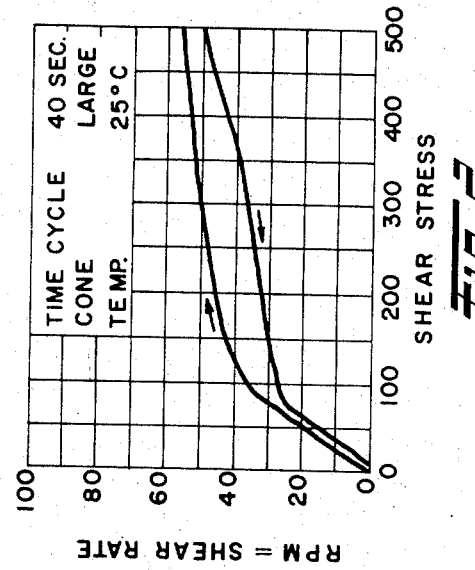
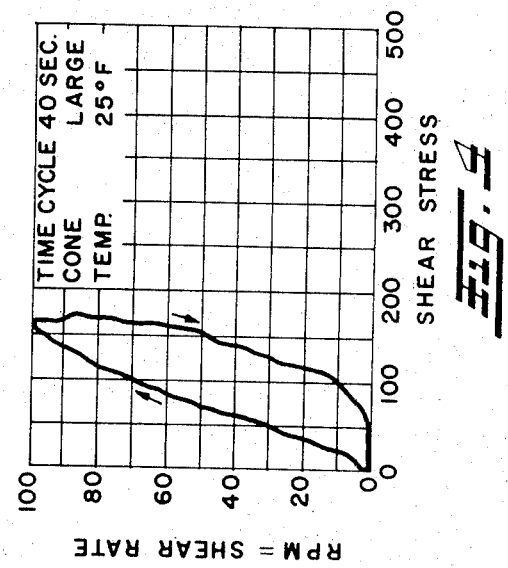
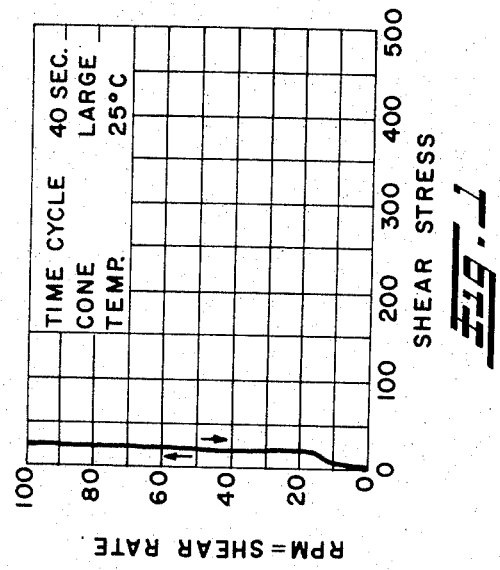
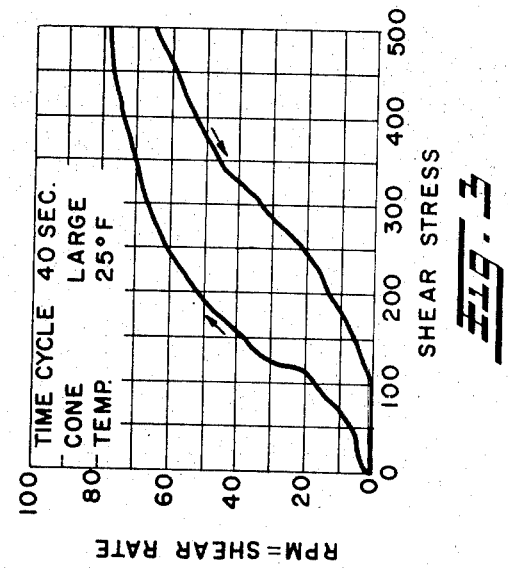

3,728,295
DILATANT LATEX OF AT LEAST TWO ALIPHATIC MONO-UNSATURATED ESTERS AND AN ALIPHATIC MONO-UNSATURATED CARBOXYLIC ACID
Earl L. Skinner, Homewood, Ill., assignor to The Sherwin-Williams Company, Cleveland, Ohio
Continuation-in-part of abandoned application Ser. No. 735,271, June 7, 1968. This application Feb. 25, 1971, Ser. No. 118,877
Int. Cl. C08f 29/38
U.S. Cl. 260—29.6 TA                        33 Claims

ABSTRACT OF THE DISCLOSURE

There is provided a dilatant latex formed from a plurality of monomers including at least two aliphatic mono-unsaturated esters and a small amount of an aliphatic mono-unsaturated carboxylic acid. The polymer is formed by an emulsion polymerization technique carried out in the presence of a water-soluble polyhydric alcohol which is a nonsolvent or substantially a nonsolvent for the polymer. There are also provided novel coating compositions in which this product may be used as a paint vehicle component or used as an additive to other latex type paint vehicles to adjust the rheological properties of the system.

RELATED APPLICATION

This application is a continuation-in-part of the now abandoned application Ser. No. 735,271 filed June 7, 1968.

This invention relates as indicated to a dilatant latex which is characterized in that the polymerization procedure by which the latex is produced is an emulsion polymerization procedure carried out in the presence of a polyhydric alcohol which is soluble in water and which polyhydric alcohol is a nonsolvent or substantially a nonsolvent for the latex polymer. The monomers from which the latex is produced include a pair of aliphatic mono-unsaturated esters and a small amount of an aliphatic mono-unsaturated carboxylic acid. This invention also contemplates the provision of a novel latex coating composition vehicle characterized by dilatancy.

For quite some time now, various kinds of latices have been used as vehicles for coating compositions. The primary development in the utilization of these materials as vehicles has been in interior coating compositions such as wall paints. More recently, developments have been made in the utilization of various latices as vehicles for the production of outside house paints or coating compositions which are to be exposed to weather. A difficulty which has been encountered in respect of the use of such coating compositions is that the person making the application of such coating compositions to a surface has a tendency to "work" the paint or coating compositions to too great an extent resulting in the application of a film which may suffer some loss in the durability characteristics, or fail to achieve proper hiding simply because it is too thin. This is particularly true of the so-called "thixotropic" latex coating compositions which have enjoyed popularity because of their resistance to dripping off the brush or roller at the time a supply is transferred from the paint bucket to the wall or surface being painted. As such a paint on the brush is submitted to shearing forces by "working" the brush, its rheological properties result in its becoming thinner and thus more easily spread. When the shearing action ceases, then the coating composition again sets to a more solid nonflowing mass and resists dripping from the brush or roller, or running down the surface just painted. Commercially available paint latices are nondilatant, and in some cases, thixotropic.

Loss of durability and improper covering can be controlled, it has now been found, by utilizing as the latex vehicle or including as a portion of the latex vehicle, a dilatant latex which has quite the opposite rheological property as that possessed by a thixotropic coating composition. Whereas thixotropy is the tendency of a liquid body to decrease in viscosity with shearing or working, dilatancy is the tendency of a liquid body to increase in viscosity with increased shear rate and working. This quality is desirable in latex paint systems to build in control so that latex paints in general, and exterior paints in particular, are not applied in such thin films as to lack the requisite durability or the requisite hiding power. Thus, as the individual applying the coating composition seeks to work the composition too much in order to make it go further, the increased working of the material on the brush and in the deposited film causes an increase in the viscosity. The individual applying such a coating composition becomes "tired" and gives up working a given quantity in preference for a more easily worked and applied fresh supply from the paint container. Durability and hiding are thereby better achieved.

The property of dilatancy is well known, and reference may be had to "Colloid Dispersions" by E. K. Fischer, 1950, pp. 198–205, for a discussion of this property.

It has been found that dilatancy can be conferred upon an emulsion polymerized latex by carrying out the polymerization in the presence of a material which is soluble in water, but which is substantially a nonsolvent for the latex polymer. This material is preferably a polyhydric alcohol. Most unexpectedly, when the latex polymerization reaction is carried out in the presence of a substantial portion of such a water-soluble polyhydric alcohol, the resultant latex demonstrates the property of dilatancy.

Thereafter, the latex may be used alon or in combination with another latex as the vehicle for coating compositions designed for application to exterior surfaces or interior surfaces and which compositions will be characterized by the property of dilatancy.

In the annexed graphs:

FIG. 1 shows a plot of shear rate against shear stress for a commercially available acrylic type latex conventionally used in formulating latex paints and demonstrating pseudoplastic behavior.

FIG. 2 shows a like plot of the dilatant latex of Example I hereinafter described.

FIG. 3 shows a like plot of the dilatant latex of Example II hereafter described.

FIG. 4 shows a like plot of the dilatant latex of Example III hereinafter described.

Figure 5:
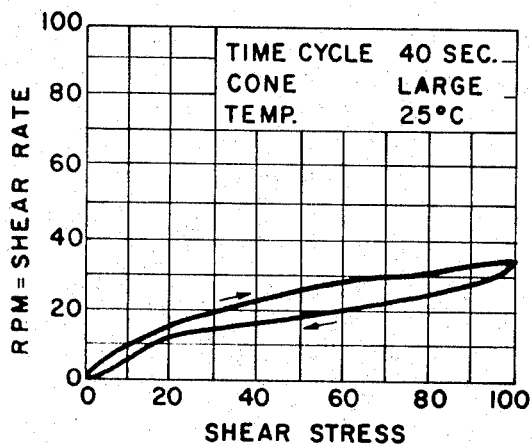
FIGS. 5, 6, 7, 8 and 9 show like plots of dilatant latices of Examples Ia, Ib, Ic, Id, and Ii, respectively.
Figure 6:
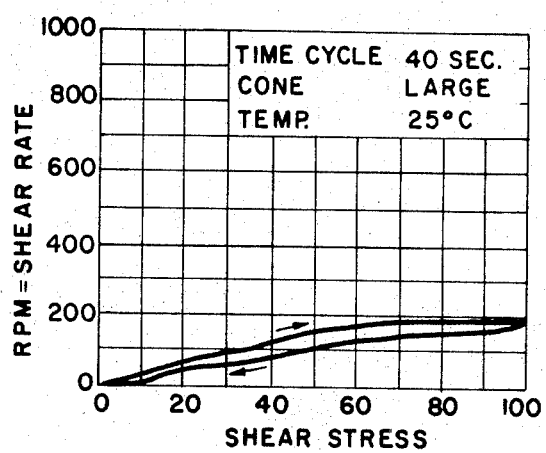
Figure 7:
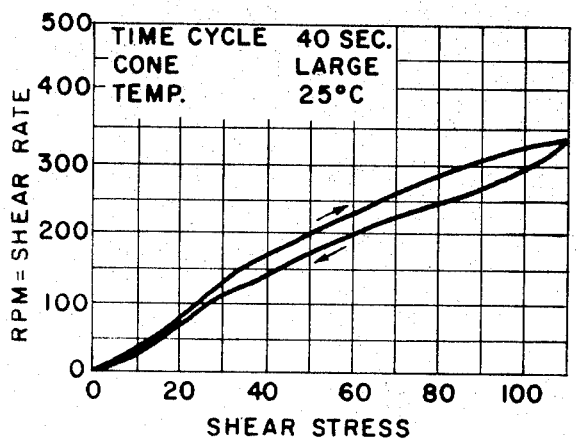
Figure 8:
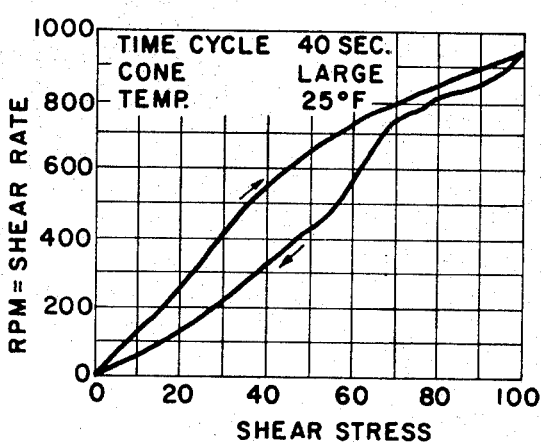
Figure 9:
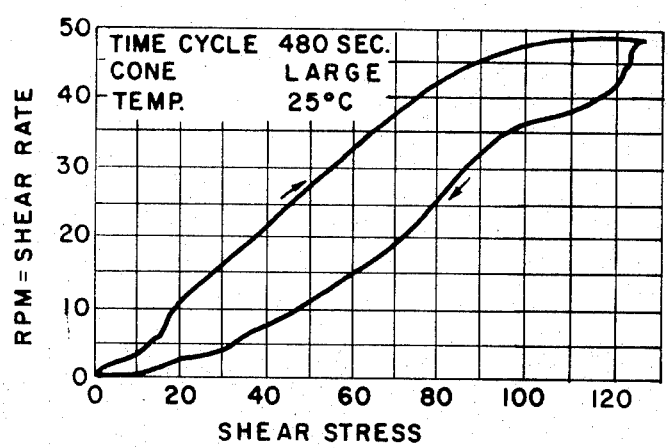

Briefly stated, then, the present invention is in the provision of an emulsion-polymerized dilatant latex which comprises an aqueous dispersion of a polymer of a first aliphatic mono-unsaturated ester containing from 4 to 7 carbon atoms, a second and different aliphatic mono-unsaturated ester containing from 5 to 13 carbon atoms, and from 1% to 5% by weight of the combined weight of the monomers of an aliphatic mono-unsaturated carboxylic acid containing 3 to 4 carbon atoms. This polymer is formed in an aqueous medium which includes from 1% to 20% by weight of the monomers of a water-soluble polyhydric alcohol. The polymer so produced is substantially insoluble in the polyhydric alcohol.

Polymers which have been found to be especially useful as latex coating compositions displaying rheological properties shifted toward dilatancy are interpolymers of at least two unsaturated aliphatic esters and at least one low molecular weight unsaturated aliphatic monocarboxylic acid.

The esters are desirably of two different species although not necessarily of different molecular weight. The unsaturation is ethylenic unsaturation, and in the ester may have been derived from, or associated with, either the acid moiety or the alcohol moiety.

One of the esters is selected from those unsaturated esters containing from 4 to 7 carbon atoms. Such esters are of two types and have a structure of an ester of an unsaturated aliphatic monocarboxylic acid and a saturated alcohol, or they have the structure of an ester of a saturated aliphatic monocarboxylic acid and an unsaturated alcohol. These include the alkyl acrylates, and chloroacrylates such as methyl acrylate, methyl methacrylate, methyl alpha-chloroacrylate, ethyl acrylate, ethyl alpha-chloroacrylate, n-propyl acrylate, iso-propyl acrylate, n-butyl acrylate, t-butyl acrylate, ethyl methacrylate, etc.; the vinyl alcohol esters of $C_2$–$C_6$ aliphatic monocarboxylic acids, e.g. vinyl acetate, vinyl propionate, vinyl butyrate. Those esters possessing alpha-beta unsaturation are preferred for use herein.

Another of the esters is selected from those unsaturated esters containing from 5 to 13 carbon atoms. Although there is some overlapping with the previous group of esters insofar as their range of carbon atom content is concerned, so long as the ester selected in this group is a different species from that selected in the first group, regardless of the similarity or dissimilarity in carbon atom content, its selection is contemplated hereby. Thus, as the ester from the first group, one may utilize methyl methacrylate, and as the second ester, ethyl acrylate. The second group of useful esters includes, therefore, those esters of the first group containing from 5 to 7 carbon atoms, and additionally pentyl acrylate, hexyl acrylate, 2-ethylhexyl acrylate, n-octyl acrylate, decyl acrylate, as well as the corresponding alpha-chloroacrylates; vinyl caproate, vinyl caprylate, vinyl caprate, vinyl alcohol esters of mixed $C_9$–$C_{11}$ aliphatic saturated monocarboxylic acids, etc.

The esters of the first and second groups are present in monomeric form in the emulsion polymerization mixture in a molar ratio of from about 3:1 to about 1:10, respectively.

In referring to "esters" herein, it is convenient to specify the alcohol moiety and the carboxylic acid moiety as if derived from an alcohol and from a carboxylic acid. The manner is which the ester is synthesized is not important to this inveniton. Thus the language "having the structure of an ester of an unsaturated aliphatic monocarboxylic acid and a saturated alcohol," for example, is intended to identify the ester per se independently of its method of production.

The third essential ingredient of the monomer mixture is at least one aliphatic alpha-beta mono-unsaturated carboxylic acid containing 3 or 4 carbon atoms, for example acrylic acid, methyl acrylic acid, alpha-chloro acrylic acid, beta-chloro acrylic acid, crotonic acid, iso-crotonic acid, chloro-crotonic acid, and chloro-iso-crotonic acid.

Polymers of selected members of each of the foregoing monomer classes, when interpolymerized under the normal emulsion polymerization procedures do not display the property of dilatancy. However, when from 1% to 25% by weight of a water soluble polyhydric alcohol which alcohol is a nonsolvent for the polymer is included in the emulsion upolymerization mixture along with the monomers, wetting agents, catalysts, initiators and water normally used in such reactions, the resulting latex has the property of dilatancy. Specific examples of such polyhydric alcohols include ethylene glycol, diethylene glycol, propylene glycol, tetramethylene glycol, hexamethylene glycol, NNN′N′ - tetrakis - (2 - hydroxypropyl) ethylene diamine, dipropylene glycol, bis - (4 - hydroxypropoxy phenyl) dimethyl methane, neopentyl glycol, glycerol trimethylol ethane, trimethylolpropane, 2-amino-2-hydroxy methyl) - 1,3 - propanediol, sorbitol, sucrose, starch, amylopectin, mannitol-d, etc. Pentaerythritol has too low a solubility in water to be satisfactory.

In addition to the foregoing essential ingredients, very low percentages, i.e. from 1% to 5% by weight, of the monomer content of special monomers may be included. Such special monomers include diacetone acrylamide, ethylene glycol dimethacrylate, N-methylol acrylamide, acrylamide, glycidyl methacrylate, 2-hydroxyethyl methacrylate, 2-hydroxypropyl methacrylate, dimethyl aminoethyl methacrylate, and t-butyl aminoethyl methacrylate.

Additionally, it is sometimes found convenient to include a very minor amount, on the order of 0.1% to 1% by weight, of a partially hydrolyzed polyvinyl alcohol thickening agent in the polymerization system. The special monomers and the thickening agents are not essential, however, to the production of useful dilatant latices.

The latex so produced may be used as such to provide a useful latex paint vehicle. Formulation of paints with such latex is according to procedures well known in the art. Alternatively, this latex may be used as an addition agent to other latices commonly used in formulating paints to impart to the resulting paint or coating composition the property of dilatancy to a predetermined degree. By blending latices, one of which is the dilatant latex hereof, the proper degree of dilatancy may be imparted to the paint so that the tendency of the painter to apply too thin a coating will be discouraged for the most part.

It becomes convenient at this point to provide illustrative examples of the preparation of dilatant latices useful in the manners above-indicated, it being understood that these examples are for illustrative purposes only. Other examples will become readily apparent.

EXAMPLE I

| | [1] P.b.w. |
|---|---|
| (1) Distilled water (or deionized water) | 150.0 |
| (2) Ethylene glycol | 150.0 |
| (3) Octylphenyl polyethoxy ethanol (70 moles EtO) | 10.0 |
| (4) Isooctylphenyl polyethoxy ethanol (5 moles EtO) | 20.0 |
| (5) Butyl acrylate | 164.6 |
| (6) Methyl methacrylate | 135.4 |
| (7) Methacrylic acid | 8.0 |
| (8) Ferrous sulphate solution (0.3 gm. $FeSO_4 \cdot 7H_2O$ in 200 ml. $H_2O$) | 4.0 |
| (9) Cumene hydroperoxide | 2.0 |
| (10) Sodium sulphoxylate formaldehyde ($NaHSO_2 \cdot CH_2O$) | 0.5 |
| (11) Distilled water | 350.0 |
| (12) Isooctylphenyl polyethoxy ethanol (9–10 moles EtO) | 10.0 |
| (13) Butyl acrylate | 164.6 |
| (14) Methyl methacrylate | 135.4 |
| (15) Methacrylic acid | 8.0 |
| (16) Ferrous sulphate solution (as above) | 4.0 |
| (17) Cumene hydroperoxide | 2.0 |
| (18) Sodium sulfoxylate formaldehyde in 10 ml. $H_2O$ | 0.5 |
| (19) $NH_4OH$ (commercial aqueous solution) (to pH 9.3) | |

[1] Parts by weight.

To a resin flask equipped with a motor-driven agitator, thermometer and reflux condenser, items (1) to (7) inclusive are added. The mixture is blanketed with inert gas ($N_2$) and agitated for 5 minutes. The ferrous sulphate solution (8) is prepared, added to the polymer mixture including the glycol (2). Then items (9) and (10) are added in succession. The reaction will start and a peak temperature of approximately 150° F. is reached in about 15 to 30 minutes. After the exothermic reaction is over (about one hour) and the batch cools spontaneously to 100° F., items (11) to (15) are added. Fresh ferrous sulphate solution is prepared as before and added to the monomer diluted mass in the flask. Items (17) and (18) are added. The reaction takes place after a very short induction period and within 15 to 30 minutes reaches peak exothermic temperature of 150° F. When the exothermic reaction is over and the batch cools to 100° F. or lower, (19) is added and agitation continued for 10 to 15 minutes. The latex may be stored or used.

The resultant latex is very stable upon dilution with water (10:1), exposure in a hot room (120° F.) for 4 months, and after 5 freeze-thaw cycles.

This latex has an NVM (non-volatile matter) of 49.7% ± .5%, a pH of 9.3 and a weight per gallon of 8.97 pounds. When tested on a Ferranti-Shirley viscometer, it demonstrates the property of dilatancy, as shown in FIG. 2. Dilatancy is shown when the measurements taken at decreasing shear rate (r.p.m.) generally show higher shear stress, i.e. the curve is displaced to the right of the curve drawn by the apparatus when proceeding in the opposite direction. In the case of the opposite property, thixotropy, the return curve would show values to the left of the curve drawn with increasing shear rates.

Other water soluble, polymer nonsolvent polyhydric alcohols containing three or more hydroxyl groups were tested as follows:

EXAMPLE Ia

Except for item (2) in Example I, the formulation and procedure is the same as that in Example I.

(2) Glycerin—150.0 p.b.w.

The resulting latex is dilatant and has properties close to those of the preceding examples. When tested on a Ferranti-Shirley viscometer, it demonstrates the property of dilatancy.

EXAMPLE Ib

Except for item (2) in Example I, the formulation and procedure is the same as that in Example I.

(2) Trimethylol ethane—150.0 p.b.w.

The resulting latex is dilatant and has properties close to those of the preceding examples. When tested on a Ferranti-Shirley viscometer, it demonstrates the property of dilatancy.

EXAMPLE Ic

Except for item (2) in Example I, the formulation and procedure is the same as that in Example I.

(2) Trimethylol propane—150.0 p.b.w.

The resulting latex is dilatant and has properties close to those of the preceding examples. When tested on a Ferranti-Shirley viscometer, it demonstrates the property dilatancy.

EXAMPLE Id

Except for item (2) in Example I, the information and procedure is the same as that in Example I.

(2) 2-amino - 2(hydroxymethyl) - 1,3 - propanediol—150.0 p.b.w.

The resulting latex is dilatant and has properties close to those of the preceding examples. When tested on a Ferranti-Shirley viscometer, it demonstrates the property of dilatancy.

EXAMPLE Ie

Except for item (2) in Example I, the formulation and procedure is the same as that in Example I.

(2) Sorbitol—150.0 p.b.w.

The resulting latex is dilatant and has properties close to those of the preceding examples.

Example Ie or the following latex preparations which are exact repeats of Example I with the exception of item (2) were not tested on the Ferranti-Shirley because of very high viscosities. The sorbitol-latex and the following latexes were dilatant. However, due to the affinity for water of the polyhydric materials they caused the latexes to become very high in viscosity. In other words, even smaller amounts of polyhydric material could have been used to make the latex dilatant. Other substitutions for item (2) in Example I are:

EXAMPLE If (2) Sucrose—150.0 p.b.w.

EXAMPLE Ig

|     | P.b.w. |
| --- | --- |
| (1) Water | 285.0 |
| (2) Starch | 15.0 |

EXAMPLE Ih

|     | P.b.w. |
| --- | --- |
| (1) Water | 270.0 |
| (2) Amylopectin | 30.0 |

EXAMPLE Ii

|     | P.b.w. |
| --- | --- |
| (1) Water | 264.0 |
| (2) Mannitol D | 36.0 |

The resulting latexes are dilatant and have properties close to those of the preceding examples.

When 100% clear latex films of Examples Ia to Ii were applied to a glass surface, all of the latexes dried to cohesive films. The polyhydric materials which were solid at room temperature dried in the film while the normally liquid polyhydric materials appeared to be extruded out of the film initially but on standing no exudant remained on the surface. All of the polyhydric materials are useful in paint compositions under conditions specific to an end use which tolerates their individual characteristics.

EXAMPLE II

|     | P.b.w. |
| --- | --- |
| (1) Distilled water | 150.0 |
| (2) Ethylene glycol | 150.0 |
| (3) Octylphenyl polyethoxy ethanol (70 moles EtO) | 10.0 |
| (4) Isooctylphenyl polyethoxy ethanol (5 moles EtO) | 20.0 |
| (5) Ethyl acrylate | 195.3 |
| (6) Methyl methacrylate | 104.7 |
| (7) Methacrylic acid | 8.0 |
| (8) $FeSO_4$ solution (see Example I) | 4.0 |
| (9) Cumene hydroperoxide | 2.0 |
| (10) Sodium sulphoxylate formaldehyde | 0.5 |
| (11) Distilled water | 350.0 |
| (12) Isooctylphenyl polyethoxy ethanol (9–10 moles EtO) | 10.0 |
| (13) Ethyl acrylate | 195.3 |
| (14) Methyl methacrylate | 104.7 |
| (15) Methacrylic acid | 8.0 |
| (16) $FeSO_4$ solution (see Example I) | 4.0 |
| (17) Cumene hydroperoxide | 2.0 |
| (18) Sodium sulphoxylate formaldehyde | 0.5 |
| (19) $NH_4OH$ (to pH 9.3). | |

The procedure in this example is identical to that followed in Example I. The resultant latex, like that of Example I, is very stable. The NVM is 49.7% ±.5%, the pH is 9.3 and the weight per gallon is 9.07 pounds. When tested on a Ferranti-Shirley viscometer, it demonstrates the property of dilatancy, as shown in FIG. 3.

EXAMPLE III

Except for items (5), (6), (7), (13), (14) and (15) in Example I, the formulation and procedure is the same as that in Example I.

| | P.b.w. |
|---|---|
| (5) 2-ethylhexyl acrylate | 120.0 |
| (6) Methyl methacrylate | 180.0 |
| (7) Methacrylic acid | 6.0 |
| (13) 2-ethylhexyl acrylate | 120.0 |
| (14) Methyl methacrylate | 180.0 |
| (15) Methacrylic acid | 6.0 |

The resulting latex is dilatant and has properties close to those of the preceding examples. When tested on a Ferranti-Shirley viscometer, it demonstrates the property of dilatancy as shown in FIG. 4.

EXAMPLE IV

Except for items (5), (6), (7), (13), (14), and (15) in Example I, the formulation and procedure is the same as that in Example I.

| | P.b.w. |
|---|---|
| (5) Butyl acrylate | 30.0 |
| (6) Butyl methacrylate | 270.0 |
| (7) Methacrylic acid | 6.0 |
| (13) Butyl acrylate | 30.0 |
| (14) Butyl methacrylate | 270.0 |
| (15) Methacrylic acid | 6.0 |

The resulting latex is dilatant and has properties close to those of the preceding examples.

EXAMPLE V

Except for items (5), (6), (7), (13), (14), and (15) as in Example I, the formulation and the procedure is the same as that in Example I.

| | P.b.w. |
|---|---|
| (5) Butyl acrylate | 164.6 |
| (6) Methyl methacrylate | 135.4 |
| (7) Methacrylic acid | 8.0 |
| (7a) Diacetone acrylamide | 6.0 |
| (13) Butyl acrylate | 164.6 |
| (14) Methyl methacrylate | 135.4 |
| (15) Methacrylic acid | 8.0 |
| (15a) Diacetone acrylamide | 6.0 |

The foregoing latex includes an additional polymer material in the monomer mixture, namely di acetone acrylamide. The resulting latex is dilatant and has properties close to those of the preceding examples.

EXAMPLE VI

Except for items (5), (6), (7), (13), (14), and (15) in Example I, the formulation and procedure is the same as that in Example I.

| | P.b.w. |
|---|---|
| (5) Butyl acrylate | 164.6 |
| (6) Methyl methacrylate | 135.4 |
| (7) Methacrylic acid | 8.0 |
| (13) Butyl acrylate | 164.6 |
| (14) Methyl methacrylate | 135.4 |
| (15) Methacrylic acid | 8.0 |

In adjusting the pH of the final latex, in addition to ammonia hydroxide, 2.7 p.b.w. of ethyleneimine were used. The resulting latex is dilatant and has properties close to those of the preceding examples.

EXAMPLE VII

This example is exactly the same as Example VI except that propyleneimine is substituted for ethyleneimine and used in the amount of 5.0 p.b.w. with ammonium hydroxide being utilized to provide a pH of 7.0.

EXAMPLE VIII

| | P.b.w. |
|---|---|
| (1) Distilled water | 30.0 |
| (2) Ethylene glycol | 150.0 |
| (3) Desalted sodium dodecyl benzene sulphonate | 2.1 |
| (4) Sodium borate | 0.12 |
| (5) Potassium persulphate | 0.6 |
| (6) Distilled water | 360.0 |
| (7) Desalted sodium dodecyl benzene sulphonate | 2.0 |
| (8) Nonyl phenol polyethylene glycol ether | 15.0 |
| (9) Sodium borate | 2.9 |
| (10) Potassium persulfate | 2.4 |
| (11) Vinyl alcohol ester of $C_9$–$C_{10}$ aliphatic saturated acids | 297.0 |
| (12) Vinyl acetate | 297.0 |
| (13) Acrylic acid | 18.0 |
| (14) Ammonium hydroxide to adjust pH to 7.0. | |

Items (1) to (4) inclusive are added to a reaction flask equipped with an agitator and purged with nitrogen. The aqueous solution is heated to 176° F. and the potassium persulphate item (5) is added. A solution is then formed of the components numbered (6) to (10) inclusive, and separately there is prepared a solution of items (11), (12), and (13). The solution of items (6) to (10) inclusive is then added to the solution of items (11) to (13) inclusive under vigorous stirring in a Waring Blendor. The resultant emulsion is quite stable. This prepolymer emulsion of the monomers is then added at a uniform rate to the reactor over a period of 2–3 hours under a nitrogen blanket at 176° F. After complete addition of the monomers, the product is digested at 176° F. for a period of 2 hours. During the entire reaction, the reaction mass is agitated by a stirrer. After completion of the reaction, the pH of the system is adjusted to 7 with ammonium hydroxide.

As indicated above, the latices produced in accordance with the above examples may be used as the vehicles in formulating a latex paint. From this point forward, the latices may be used in the conventional manner for formulating interior or exterior coating compositions. These compositions have particular applicability for exterior exposure.

A typical paint formulation is as follows:

| | P.b.w. |
|---|---|
| (1) Water | 17.27 |
| (2) Polymeric anionic surfactant | 1.73 |
| (3) Alkyl phenol polyethoxy ethanol | 0.58 |
| (4) Ammonium hydroxide | 0.43 |
| (5) Titanium dioxide | 44.6 |
| (6) Magnesium silicate | 20.4 |
| (7) Mica | 4.32 |
| (8) Sodium alginate 2% solution | 5.76 |

The foregoing components provide a pigment base.

With the above pigment base, a let-down is prepared in accordance with the following formulation:

| | P.b.w. |
|---|---|
| (1) Pigment base | 56.0 |
| (2) Latex of Example I | 36.8 |
| (3) Water | 4.0 |

The foregoing provides a typical example of a white latex base paint for exterior application.

There has thus been provided a dilatant latex which is believed to be a new product per se. Also, there has been provided a process for adjusting the brushability characteristics of latex paints whereby instead of the normal thinning out of such latex paints as they continue to be worked by the painter, it is now possible to control the extent of thinning by including in such latex paints a dilatant latex agent whereby these properties are minimized so that the painter is discouraged by becoming increasingly tired of working a given brush load of paint to apply a coat which is thick enough and therefore has the requisite durability. Otherwise, the tendency is to brush the coats out too thin and seriously impair the properties of durability upon exterior exposure. Thus, use of the property of dilatancy in a latex paint as a method of controlling the brushability characteristics of a latex paint is believed to be an entirely novel approach to this problem. The amount of dilatancy controlling additive normally employed for the purpose of affecting the rheological properties of a latex coating composition is in the range of from 10% by weight of the vehicle portion of the coating composition to 100% by weight of the vehicle portion of the coating composition.

What is claimed is:

1. An emulsion polymerized latex comprising an aqueous dispersion of an interpolymer of:
    (a) an aliphatic mono-unsaturated ester containing from 4 to 7 carbon atoms;
    (b) a second and different aliphatic mono-unsaturated ester containing from 5 to 13 carbon atoms and the molar ratio of (a) to (b) being in the range of from 3:1 to 1:10, respectively; and
    (c) from about 1% to about 5% by weight of the combined weight of the monomers of an aliphatic mono-unsaturated carboxylic acid containing 3 or 4 carbon atoms;

said polymer being formed in the presence of from 1% to 25% by weight of the monomers of a water soluble polyol selected from the group consisting of polyhydric alcohols and NNN'N'-tetrakis-(2-hydroxy propyl) ethylene diamine in which polyol said polymer is substantially insoluble, said latex being characterized by the property of dilatancy.

2. A latex in accordance with claim 1 in which the first ester (a) has the structure of an ester of an unsaturated aliphatic monocarboxylic acid and a saturated alcohol.

3. A latex in accordance with claim 2 in which the unsaturated aliphatic monocarboxylic acid is acrylic acid.

4. A latex in accordance with claim 2 in which the unsaturated aliphatic monocarboxylic acid is methacrylic acid.

5. A latex in accordance with claim 2 in which the alcohol is methyl alcohol.

6. A latex in accordance with claim 2 in which the ester is ethyl acrylate.

7. A latex in accordance with claim 2 in which the ester is methyl methacrylate.

8. A latex in accordance with claim 1 in which the first ester (a) has the structure of an ester of an unsaturated monohydric alcohol and a saturated monocarboxylic acid.

9. A latex in accordance with claim 8 in which the monohydric alcohol is vinyl alcohol.

10. A latex in accordance with claim 8 in which the ester is vinyl acetate.

11. A latex in accordance with claim 1 in which the second ester (b) has the structure of an ester of an unsaturated aliphatic monocarboxylic acid and a saturated alcohol.

12. A latex in accordance with claim 11 in which the unsaturated aliphatic monocarboxylic acid is acrylic acid.

13. A latex in accordance with claim 11 in which the unsaturated aliphatic monocarboxylic acid is methacrylic acid.

14. A latex in accordance with claim 11 in which the alcohol is butyl alcohol.

15. A latex in accordance with claim 11 in which the alcohol is ethyl alcohol.

16. A latex in accordance with claim 1 in which the second ester is butyl acrylate.

17. A latex in accordance with claim 1 in which the second ester (b) has the structure of an ester of an unsaturated monohydric alcohol and a saturated monocarboxylic acid or mixture of such acids.

18. A latex in accordance with claim 17 in which the alcohol is vinyl alcohol.

19. A latex in accordance with claim 17 in which the second ester (b) has the structure of the vinyl alcohol ester of mixed $C_9$ and $C_{10}$ aliphatic saturated monocarboxylic acids.

20. A latex in accordance with claim 1 in which the aliphatic mono-unsaturated carboxylic acid (c) is an alpha-beta unsaturated monocarboxylic acid.

21. A latex in accordance with claim 20 in which the acid is acrylic acid.

22. A latex in accordance with claim 20 in which the acid is methacrylic acid.

23. A latex in accordance with claim 1 in which component (a) is ethyl acrylate; component (b) is butyl acrylate; and component (c) is methacrylic acid.

24. A latex in accordance with claim 1 in which component (a) is methyl methacrylate; component (b) is ethyl acrylate; and component (c) is methacrylic acid.

25. A latex in accordance with claim 1 in which component (a) is vinyl acetate; component (b) has the structure of an ester of vinyl alcohol and a mixed aliphatic $C_9$ to $C_{10}$ saturated monocarboxylic acid; and component (c) is acrylic acid.

26. A latex in accordance with claim 1 in which the polyhydric alcohol is a $C_2$ to $C_6$ aliphatic glycol.

27. A latex in accordance with claim 26 in which the glycol is ethylene glycol.

28. A coating composition comprising an aqueous dispersion of the interpolymer of:
    (a) an aliphatic mono-unsaturated ester containing from 4 to 7 carbon atoms;
    (b) a second and different aliphatic mono-unsaturated ester containing from 5 to 13 carbon atoms, the molar ratio of (a) to (b) being in the range of from 3:1 to 1:10, respectively; and
    (c) from about 1% to about 5% by weight of the combined weight of the monomers of an aliphatic mono-unsaturated carboxylic acid containing 3 or 4 carbon atoms;

said polymer being formed in the presence of from 1% to 25% by weight of the monomers of a water soluble polyol selected from the group consisting of polyhydric alcohols and NNN'N'-tetrakis-(2-hydroxy propyl) ethylene diamine in which polyol said polymer is substantially insoluble.

29. A coating composition in accordance with claim 28 in which component (a) is ethyl acrylate; component (b) is butyl acrylate; and component (c) is methacrylic acid.

30. A coating composition in accordance with claim 28 in which component (a) is methyl methacrylate; component (b) is ethyl acrylate; and component (c) is methacrylic acid.

31. A coating composition in accordance with claim 28 in which component (a) is vinyl acetate; component (b) has the structure of an ester of vinyl alcohol and a mixed aliphatic $C_9$ to $C_{10}$ saturated monocarboxylic acid; and component (c) is acrylic acid.

32. A coating composition in accordance with claim 28 in which the polyhydric alcohol is ethylene glycol.

33. An emulsion polymerized latex comprising an aqueous dispersion of an interpolymer of:
    (a) an aliphatic mono-unsaturated ester containing from 4 to 7 carbon atoms;
    (b) a second and different aliphatic mono-unsaturated ester containing from 5 to 13 carbon atoms, the molar ratio of (a) to (b) being in the range of 3:1 to 1:10;
    (c) a third specialty monomer selected from diacetone acrylamide, ethylene glycol dimethyacrylate, N-methylol acrylamide, acrylamide, glycidyl methacrylate, 2-hydroxyethyl methacrylate, 2-hydroxypropyl methacrylate, dimethyl aminoethyl methacrylate, and t-butyl aminoethyl methacrylate, amounting to from 1% to 5% by weight of the monomers; and (d) from about 1% to about 5% by weight of the combined weight of the monomers of an aliphatic mono-unsaturated carboxylic acid containing 3 or 4 carbon atoms;

said polymer being formed in the presence of from 1% to 25% by weight of the monomers of a water-soluble polyol selected from the group consisting of polyhydric alcohols and NNN'N'-tetrakis-(2-hydroxy propyl) ethylene diamine in which polyol said polymer is substantially insoluble, said latex being characterized by the property of dilatancy.

References Cited

UNITED STATES PATENTS

| | | | |
|---|---|---|---|
| 2,795,564 | 6/1957 | Conn et al. | 260—29.6 TA |
| 2,962,465 | 11/1960 | Lindstrom et al. | 260—29.6 TA |
| 3,012,017 | 12/1961 | Lindstrom | 260—29.6 TA X |
| 3,248,356 | 4/1966 | Snyder | 260—29.6 TA |
| 3,297,612 | 1/1967 | Lee et al. | 260—29.6 TA |

WILLIAM H. SHORT, Primary Examiner

L. M. PHYNES, Assistant Examiner

U.S. Cl. X.R.

260—29.6 ME, MN, 80.72, 80.73, 80.75, 8.8, 8.81